Nov. 5, 1935.  W. S. HOWARD  2,020,246
APPARATUS FOR HANDLING MATERIAL
Original Filed Dec. 14, 1932  5 Sheets-Sheet 1
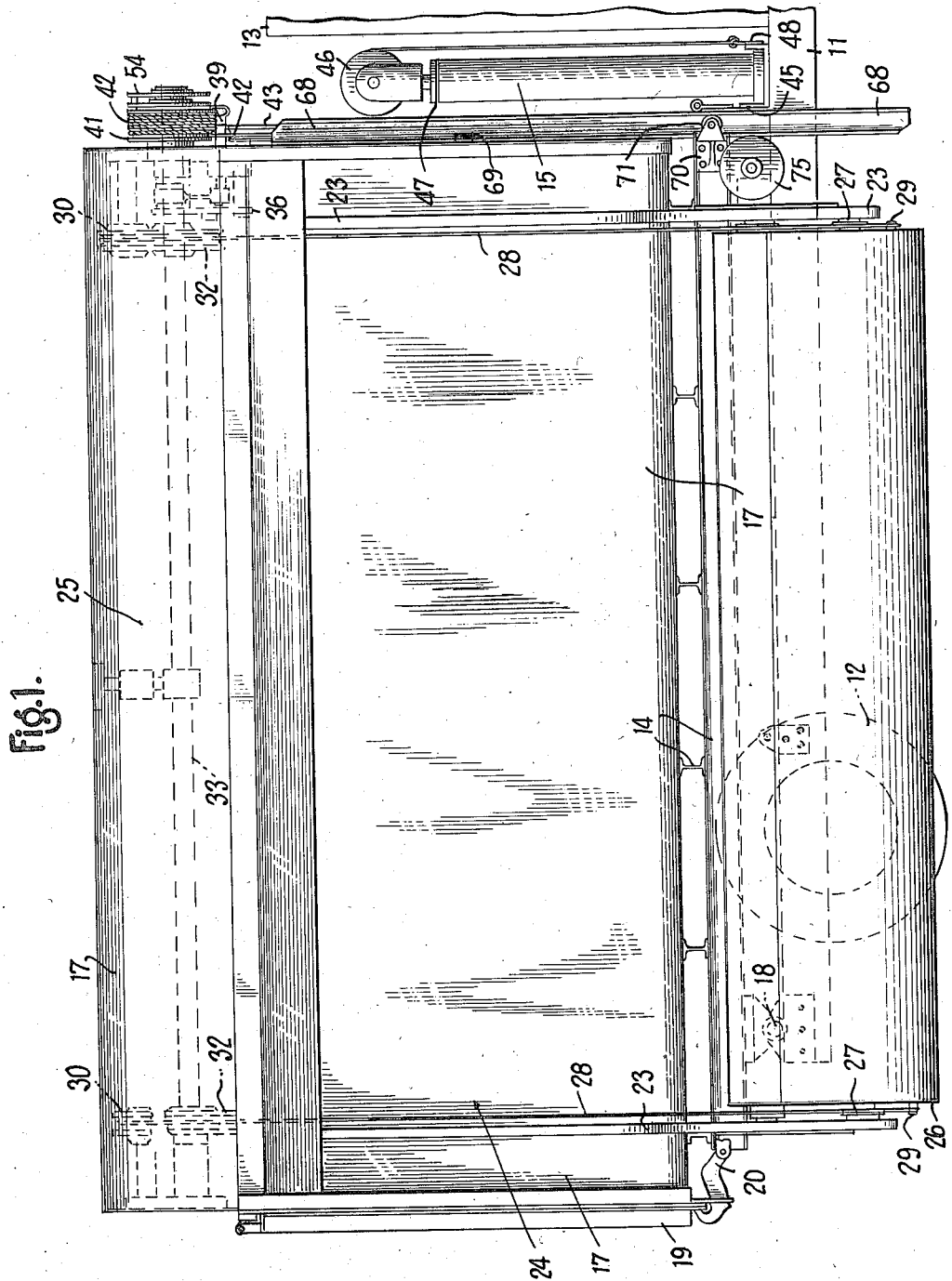
INVENTOR
William S. Howard
BY
Emery, Booth, Varney & Whittemore
ATTORNEYS

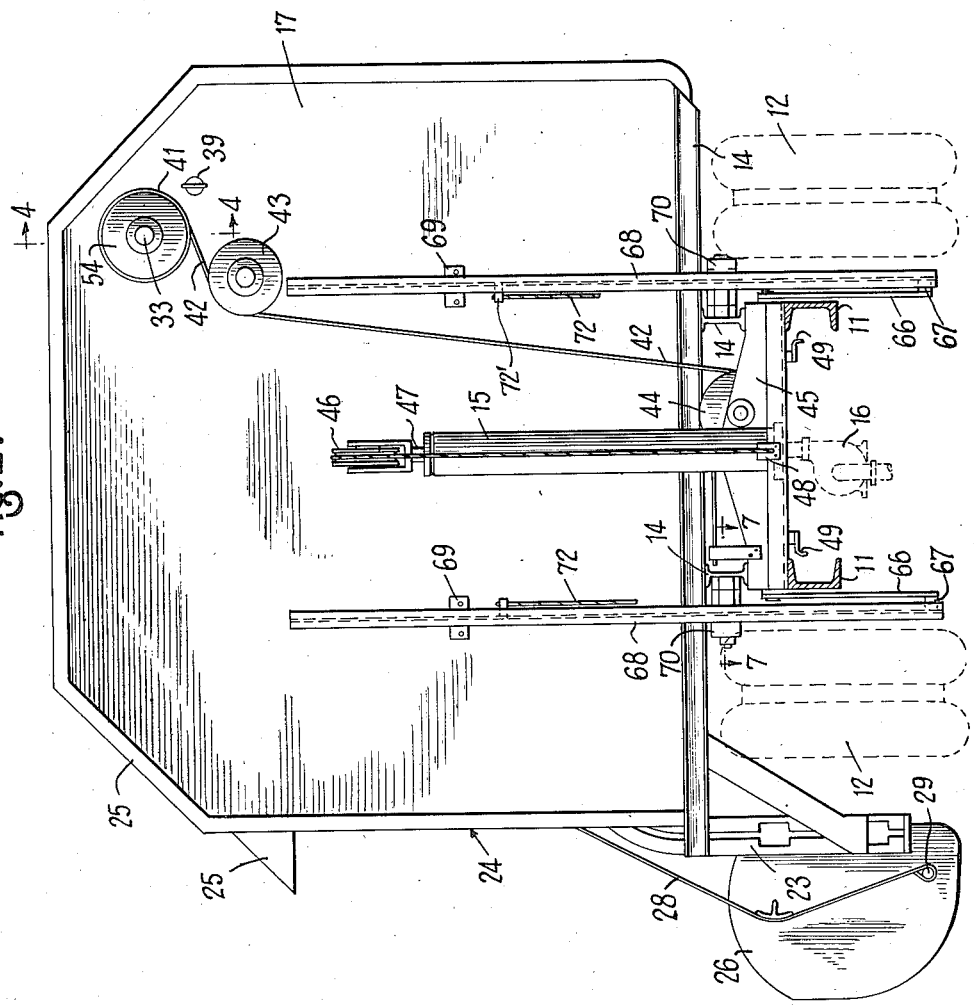

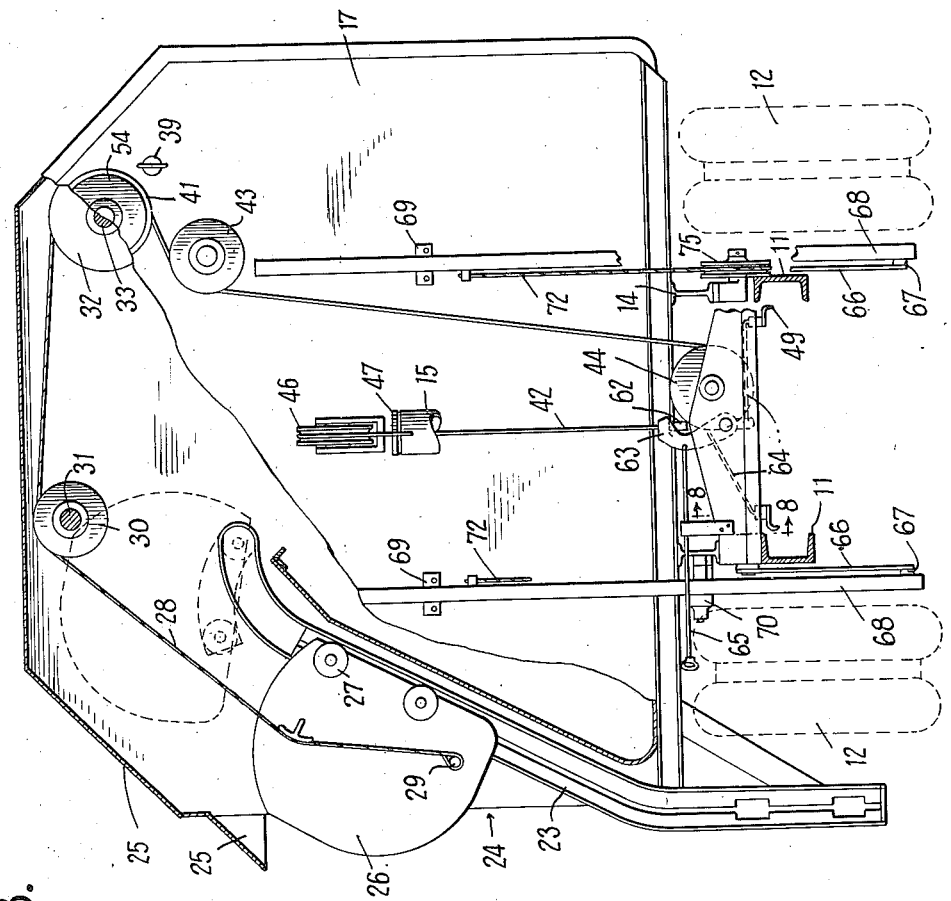

Nov. 5, 1935.   W. S. HOWARD   2,020,246
APPARATUS FOR HANDLING MATERIAL
Original Filed Dec. 14, 1932   5 Sheets-Sheet 4
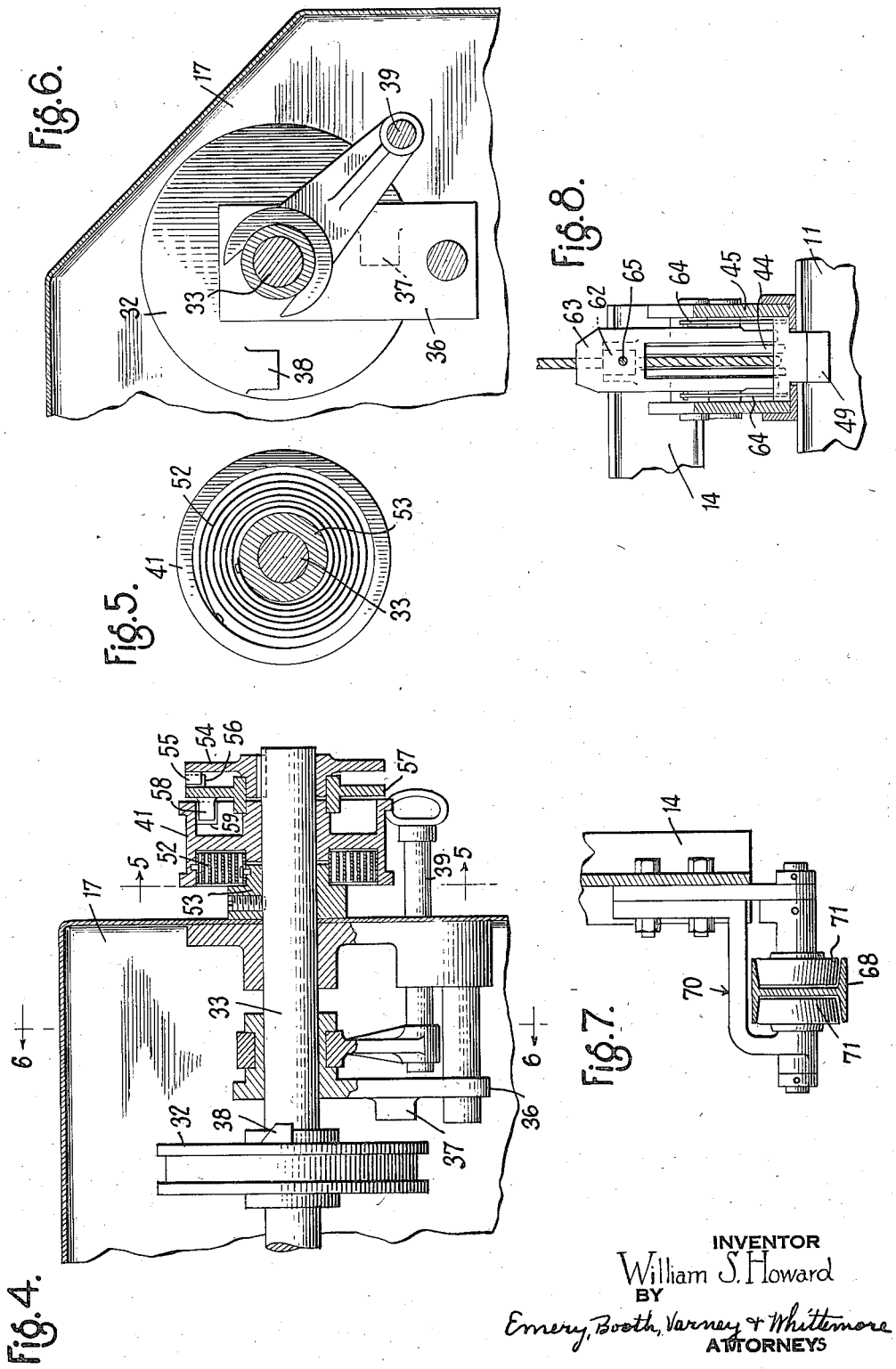
INVENTOR
William S. Howard
BY
Emery, Booth, Varney & Whittemore
ATTORNEYS Nov. 5, 1935.  W. S. HOWARD  2,020,246
APPARATUS FOR HANDLING MATERIAL
Original Filed Dec. 14, 1932   5 Sheets-Sheet 5

INVENTOR
William S. Howard
BY
Emery, Booth, Varney & Whittemore
ATTORNEYS

Patented Nov. 5, 1935

2,020,246

UNITED STATES PATENT OFFICE 2,020,246

APPARATUS FOR HANDLING MATERIAL

William S. Howard, Detroit, Mich., assignor to B. Nicoll & Company, Inc., New York, N. Y., a corporation of New York Original application December 14, 1932, Serial No. 647,141. Divided and this application November 15, 1934, Serial No. 753,101

5 Claims. (Cl. 298—22)

This invention relates to material handling apparatus and has for an object the provision of improved apparatus for raising an elevated container such as the dump body of a vehicle. The present application is a division of application Serial Number 647,141, filed December 14, 1932.

Sanitary requirements have led in recent years to the development of enclosed bodies for ash and refuse collecting vehicles in order to minimize the dissemination of dust and odors when the vehicle is being loaded or when it is traveling along the streets. These bodies are usually of large size and have their filling openings near the top, so that manual loading is inadvisable. It is preferable, since motive power is available on the automotive vehicles now in general use, to elevate and load material by power taken off from the power unit of the vehicle. Moreover, since it would require considerable time and effort to unload the body by manual labor, it is also usual to unload by power, as by tilting the body to dump the material.

Automotive vehicles with power loading and dumping means have been built or proposed heretofore but many of them because of unsatisfactory operation or expensive construction have failed to achieve their intended purpose. Whatever may have been the reasons, such vehicles have not come into very general use, and it is the purpose of the present invention to provide a vehicle of this general type which will be sufficiently simple, reliable and inexpensive to recommend itself to the trade.

A selected embodiment of the invention will now be described in order to explain the principles and advantages of the invention. In the accompanying drawings which illustrate this embodiment:

Fig. 1 is a partial side elevation of a truck embodying the invention;

Fig. 2 is a front elevation taken behind the cab and in front of the hoist cylinder.

Fig. 3 is a front elevation partly in section taken behind the hoist cylinder with the body loader in elevated position;

Fig. 4 is a longitudinal section on an enlarged scale taken on the line 4—4 of Fig. 2, showing mechanism for holding the body loader in elevated position and for taking up slack in the hoisting cable when the loader is so held;

Fig. 5 is a transverse section taken on the line 5—5 of Fig. 4;

Fig. 6 is a transverse section taken on the line 6—6 of Fig. 4;

Fig. 7 is a horizontal enlarged section taken on the line 7—7 of Fig. 2;

Fig. 8 is an enlarged vertical section taken on the line 8—8 of Fig. 3; and

Figure 9:
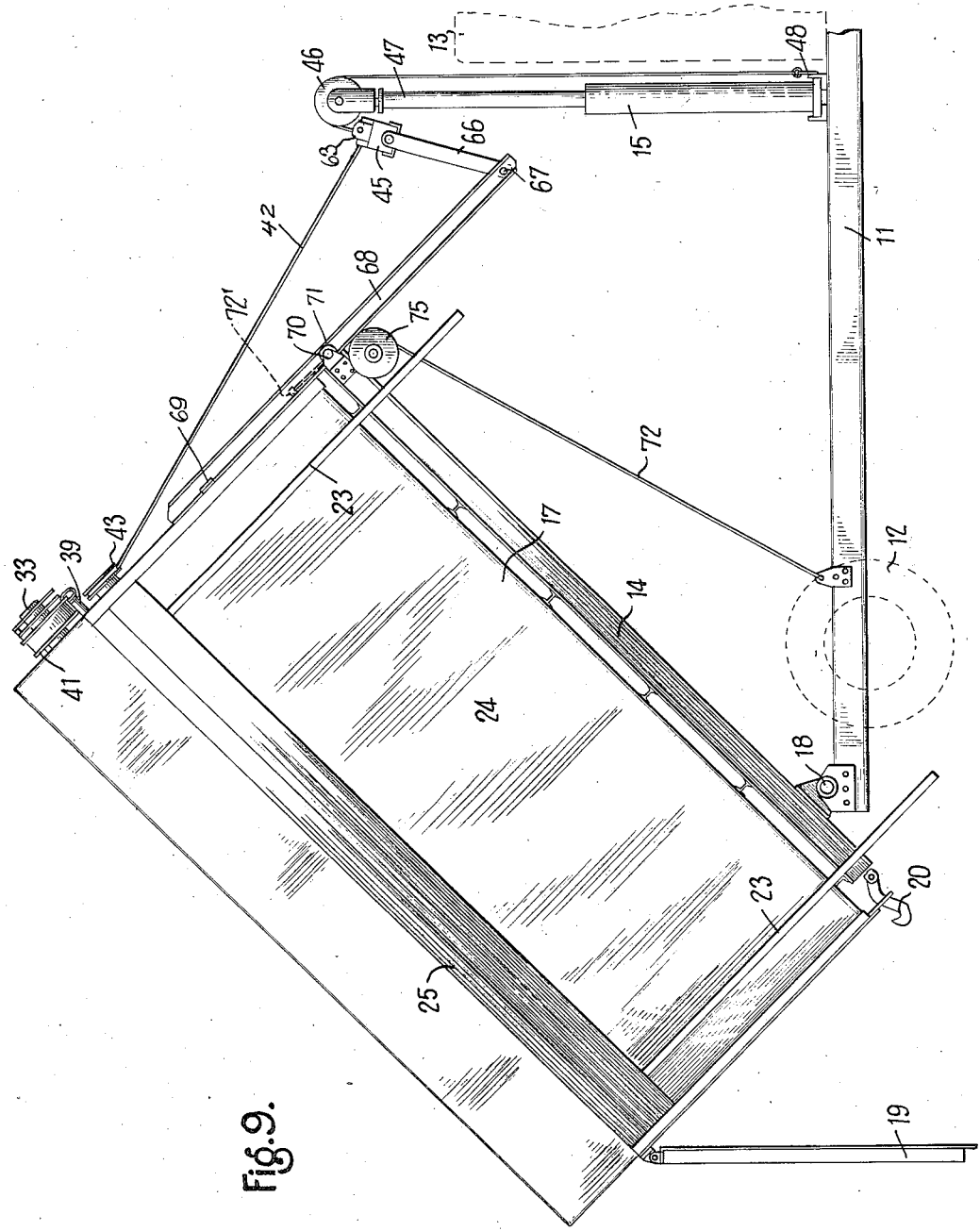
Fig. 9 is a side elevation with the body in dumping position.

As shown in Fig. 1, the vehicle or truck on which the improved apparatus is mounted according to the illustrative embodiment, comprises a chassis 11, wheels 12, cab 13, motor and power take-off (not shown), body frame 14, hydraulic hoist 15 supplied with fluid by a pump 16 (Fig. 2) which is driven by the power take-off, and a dump body 17. The body is pivoted on each side to turn about the axis 18 near the rear end for dumping. The rear door 19 of the body is held closed except when dumping by the latches 20 at either side.

Means are provided for loading material into the body by power. As shown in Figs. 1, 2 and 3, such power loading means in the present case is mounted on the side of the vehicle and comprises tracks 23 mounted near each end of the body and extending from a point near the ground to the top of the inclined side 24 of the body. The top 25 of the body overhangs the side 24 and covers an opening at the outer side of the body for receiving a bucket 26 employed for loading the body. The bucket extends substantially the full length of the body and is provided with wheels 27 at each end which ride in grooves in the tracks. The ends of the bucket opening of the body between the side 24 and the top 25 are closed at the front end by the end plate of the body and at the rear end by a smaller plate (not shown at the upper corner of the door 19).

The bucket is raised by flexible tension devices such as cables 28 attached at 29 to each end of the bucket. The cables pass over idler sheaves 30 mounted on shafts 31 above the upper end of the track and are attached to large pulleys 32 rigidly mounted on the longitudinal hoist shaft 33. The upper ends of the tracks are formed as separate sections and are hinged at their upper ends so as to lift with the bucket as it is being emptied. The bucket and rail sections may be returned by gravity or by auxiliary means such as springs (not shown). The travelling position of the bucket is shown in Fig. 3. This figure also shows the emptying position of the bucket in dotted lines. Here it is held within the entrance to the hood so as substantially to fill the same and prevent the spread of dust and odors. The bucket is maintained in this raised position by a dog 36 (Figs. 4 and 6) provided with a lug 37 adapted to engage a lug 38 on the front end of the pulleys 32. The dog 36 is slidable along the shaft 33 and is held against rotation by engagement with some fixed part of the body. The dog is operated by a control rod 39 (with suitable linkage if desired) from a manual operator arranged at some convenient place on the body.

The shaft 33 at its front end is provided with a pulley 41 to which is attached one end of a cable 42 and upon which the cable is wound when the bucket descends. The cable 42 passes over a sheave 43 on the front end of the body, thence downward beneath a sheave 44 of a yoke frame 45, up over a sheave 46 secured to the upper end of the hydraulic hoist plunger 47, and finally downward to a fixed point of attachment 48 to the truck chassis. The yoke frame 46 is associated with the body and moves therewith when the body is being dumped but at the time now being considered, i. e., when the bucket is being operated, the frame is securely anchored to the truck chassis by latches 49.

The hydraulic piston has a limited stroke in order to prevent it from rising to an undesirable height. Its upward movement is limited to a height about the same as the top of the body so that the body will protect the piston in case the truck should ever be driven along the street with the piston raised. If an overhead obstruction were encountered while the truck was moving it is evident that the hydraulic hoist would be damaged. The bucket, however, has a greater travel than the hoist would normally provide even after taking into consideration the doubled loop of cable upon which the hoist piston operates. That is, the length of bucket movement is more than twice the length of the piston movement. The difference in lengths of strokes is taken care of by making the pulleys 32 for the bucket cables 28 larger than the pulley 41 for the hoist cable 42. A greater length of the cables 28 will thus be wound up for each revolution of the shaft 33 than will be pulled out in the cable 42 from the small pulley 41.

It has been noted that the bucket is carried in an elevated position beneath the hood when the truck is travelling. It is ordinarily kept there while the body is being dumped. The hoist piston is lowered at such times so that there is a tendency for the formation of slack in the cable 42. Means are herein provided, however, for taking up this slack. The means adopted comprises (Figs. 4 and 5) a convolute spring 52 attached at its inner end to a sleeve 53 which is fast on the shaft 33 and attached at its outer end to the pulley 41 which is rotatable about the shaft 33. A disc 54 is rigidly secured to the shaft and is provided with a lug 55 interacting with a lug 56 on a loose intermediate disc 57. The disc 57 is provided with a lug 58 interacting with a lug 59 formed on the pulley 41. This mechanism provides free movement of the pulley 41 to enable the spring to take up slack in the cable while at the same time providing a positive drive of the shaft 33 in the direction to raise the bucket. The intermediate disc is provided to permit more than one complete revolution of the pulley 41 on the shaft 33. If more turns are needed more discs may be built into the mechanism.

The one hoist is employed for dumping the body as well as for raising the bucket. The same cable (42) is also employed. This is accomplished as follows: The yoke frame 45, which is movable with the body and through which the body is raised, is disconnected from the chassis and connected to the cable 42. The cable is provided with a fixed collar 62 which is adapted to be engaged by a forked hook 63 mounted on the frame. The hook 63 and the latches 49 are interconnected by rods 64 whereby they are operated coordinately when the operator moves the manual control rod 65, the hook engaging when the latches disengage and vice versa. When the hook 63 engages the cable 42 the hoist piston is in its lowermost position to insure that the collar 62 is below the hook.

Now, if it be assumed that the frame 45 is attached directly to the body, it will be seen that when the piston is again raised it will raise the body since one end of the cable is still attached to the chassis at 48. The other end of the cable beyond the collar 62 has no movement relative to the sheave 44 of the yoke frame 45 so it will raise the yoke to raise the body.

Actually in the present embodiment this simple movement does not take place because the mechanism is designed to multiply the effective length of piston stroke as applied to the body. An increased lift or distance advantage is desired, first, because the piston stroke is limited and second, because the body is long and requires a high elevation of the front end to give the proper dumping angle. Herein the yoke frame is provided with depending tension links 66 which are attached by pivot pins 67 to the lower ends of I-bars 68 which are slidably mounted in guides 69, 70 on the front end of the body. The lower guides 70 are provided with rollers 71 to permit easy sliding movements of the bars therethrough. Cables 72 are attached at one end to the upper portion of the bars 68 and at the other end to the chassis side frames at a point forward of the hinge axis of the body. Intermediately the cables pass under sheaves 75 mounted on the front end of the body.

Normally the body when down rests directly on the chassis but in all raised positions the weight of the body is borne by the cables 72 through the sheaves 75. The cables 72 tend to straighten as the body is raised and lift the body relative to the bars 68. Thus the body is raised higher than the yoke frame end I-bars are raised by the hoist. The tendency of the cables to straighten out is due to the location of the cable anchorage on the chassis frame. When the body is down the lower portion of the cables between the sheaves 75 and the point of attachment to the chassis constitutes the side of a triangle; whereas when the body is raised the corresponding portion constitutes the longer side of a triangle. Consequently this portion of the cables must increase in length, which decreases the length between the sheaves and the point of attachment to the I-bars and hence raises the body relative to the I-bars. Of course, if the cables were attached to the chassis at the hinge axis of the body there would be no advantage in length and the body would be raised only as much as the I-bars were raised, for in this case the triangle becomes an isosceles triangle.

After dumping and when the body is lowered the hook 63 is disengaged from the cable and the latches 49 are simultaneously engaged with the chassis to hold the yoke frame down in preparation for operation of the bucket.

Considering the operation in review and starting with the body, bucket and hoist all in their lowermost positions, the operators fill the bucket with material. The hoist is operated to raise the bucket to its upper position to load the material into the body. The upper end of the track partakes of this upward movement and assists in the return of the bucket. The operator opens a relief valve and the bucket returns to its bottom position by gravity. This operation is repeated as often as necessary to load the body. Short drives may be made by the truck during loading with the bucket down if there are no obstructions but for longer drives or when there are obstructions the bucket is carried in its upper position. It may be held in upper position either by leaving fluid in the hoist cylinder or by latching the bucket in raised position by the dog 36 as described. When taking long trips and especially after the body is loaded it is much better to latch the bucket up and allow the piston to retract.

When the piston retracts while the bucket is raised the spring device takes up the slack in the cable 42 to bring the collar 62 on the cable beneath the hook 63.

When ready to dump the body, the yoke frame latches 49 are released from the chassis and the hook 63 is engaged with the cable 42. The hoist is operated and through the mechanism described raises the body relative to the chassis and relative to the yoke frame and I-bars.

After dumping, the parts are returned and the yoke frame is again secured to the chassis. To begin loading the hoist is operated to elevate the bucket and the dog is released to allow the bucket to descend. The loading is conducted as before.

From the above description it will be seen that the single power hoist and certain mechanism associated therewith is used for both loading the body and for dumping the body. Also that improved mechanism is provided whereby the lift distance of the hoist is increased both for loading and for dumping. Furthermore, improved means are provided for taking slack from the hoisting cable and for holding the bucket in elevated position independently of the hoist. The invention resides in various features and combinations which have been concretely illustrated herein but which it is realized may be variously modified. The invention is, therefore, not to be regarded as limited except by the prior art and the scope of the subjoined claims.

I claim:

1. In a material handling device in combination, a base frame, an elevating body mounted on the base frame, a power device for raising the body, an intermediate lifting frame interposed between the power device and body, said lifting frame including a vertical bar slidably mounted on the body, and means coacting with said lifting frame and body for multiplying the movement of said lifting frame as transmitted to said body, said means including a cable attached to said bar above the lower front edge of the body, passing beneath a support beneath the lower front edge of the body and attached to the base frame beneath the body.

2. In a material handling device in combination, a base frame, an elevating body mounted on the frame, a power device for raising the body, an intermediate lifting frame interposed between the power device and the body, said lifting frame including vertical bars slidably mounted on the body, and means connected to said lifting frame and base frame and intermediately associated with the body for multiplying the movement of said lifting frame as transmitted to said body.

3. In a material handling device in combination, a base frame, an elevating body hinged at its rear end on the base frame, a power device for lifting the front end of the body, said power device having a given limited length of movement, and means coacting with said frame and body for increasing the effective length of movement of said body under the influence of the power device, said means comprising a rigid member mounted for vertical movement near the front end of the body, an actuating member connecting said rigid member with said power device, and a flexible member attached to said rigid member and to said frame forward of the hinge line of the body thereon and passing under the lower front edge of the body, whereby when the rigid member is raised by the power device it moves down relative to the front end of the body and the body is raised through a distance greater than the rigid member mounted thereon is raised.

4. In a material handling device in combination, a base frame, an elevating body hinged at its rear end on the base frame, a power device for lifting the front end of the body, said power device having a given limited length of movement, and means coacting with said frame and body for increasing the effective length of movement of said body under the influence of the power device, said means comprising a rigid bar mounted in guides for vertical movement on the front end of the body, an actuating member connecting the lower end of the bar with said power device, a pulley on the lower front edge of the body, and a flexible tension member attached to the bar above the bottom of the body at one end and attached to the frame forward of the hinge line of the body at its other end and intermediately passing under said pulley, whereby the weight of the body is carried on the flexible tension member and the bar has downward movement relative to the body for the purposes described.

5. In a material handling device in combination, a base frame, an elevating body hinged at its rear end on the base frame, a power device for lifting the front end of the body, said power device having a given limited length of movement, and means coacting with said frame and body for increasing the effective length of movement of said body under the influence of the power device, said means comprising a rigid member mounted on the front end of the body and slidable vertically relative thereto, means for raising said member from said power device, and a flexible tension member connected to said rigid member and to said frame and intermediately supporting said body for the purposes set forth.

WILLIAM S. HOWARD.